US006332160B1

(12) United States Patent
Tabuchi

(10) Patent No.: US 6,332,160 B1
(45) Date of Patent: Dec. 18, 2001

(54) METHOD FOR MATCHING DISTRIBUTED TRANSACTIONS AND MACHINE-READABLE RECORDING MEDIUM WITH METHOD PROGRAMS

(75) Inventor: Masahiro Tabuchi, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/104,356

(22) Filed: Jun. 25, 1998

(30) Foreign Application Priority Data

Jun. 27, 1997 (JP) .................................................. 9-187401

(51) Int. Cl.[7] .................................................. G06F 15/173

(52) U.S. Cl. ........................ 709/224; 709/225; 345/329

(58) Field of Search .................................... 709/205, 213, 709/224, 225, 228, 246, 204, 315, 317; 711/147, 150, 158; 345/329, 330, 331; 707/3, 6, 10; 714/4, 15, 48

(56) References Cited

U.S. PATENT DOCUMENTS

| 4,974,191 | * | 11/1990 | Aminghodsi et al. | ............... | 634/900 |
| 5,329,626 | * | 7/1994 | Klein et al. | ............... | 709/248 |
| 5,515,491 | * | 5/1996 | Bates et al. | ............... | 395/331 |

(List continued on next page.)

FOREIGN PATENT DOCUMENTS

| 304348 | 2/1989 | (EP) . |
| 306357 | 2/1989 | (EP) . |
| 1-152546 | 6/1989 | (JP) . |
| 1-166231 | 6/1989 | (JP) . |
| 5-20269 | 1/1993 | (JP) . |
| 5-143434 | 6/1993 | (JP) . |
| 63-310042 | 12/1998 | (JP) . |

OTHER PUBLICATIONS

Tabuci, N., "Design Summary of Middleware Group Simultaneously Common with the Disseminated Multimedia Text," Information Processing Association, 52nd (First half of 1996), National Association Comvention Report Compilation (6); Information Processing Association, Mar. 6, 1996, pp. 6–273 through 6–274.

O–sen, S., "Disseminated Composite Text Application Conceived by Group Learning," Information Processing Association, 52nd (First half of 1996), National Association Convention Report Compilation (6); Information Processing Association, Mar. 6, 1996, pp. 6–275 through 6–276.

"Distributed Multimedia Document Real–time Sharing Middle ware and Its Application for Group Learning," Apr. 26, 1996.

IBM Technical Disclosure Bulletin, No. 9, February 1991, "Integrated Concurrency Control/CPU Scheduling", pp. 37–40.*

(List continued on next page.)

Primary Examiner—Zarni Maung
Assistant Examiner—Jason D. Cardone
(74) Attorney, Agent, or Firm—McGinn & Gibb, PLLC

(57) ABSTRACT

A method is presented of matching distributed transactions from a plurality of clients working cooperatively in a network-based information system, so that semantics conflicts submitted by user applications are resolved for each network application in the network server. Transactions manager 122 in the network server 100 executes parallel processing of transactions submitted by clients 200. Semantics conflict detection section 111 in an network application 110 in the network server 100 inspects for conflicts. When an accessing conflict arises among a number of clients 200, the semantics conflict detection section 111 forwards a processing routine having a resolving method consistent with the contents of the semantics conflict to the transactions manager 122, which executes the processing routine to resolve the semantics conflict in transactions.

20 Claims, 7 Drawing Sheets

U.S. PATENT DOCUMENTS

| | | | | |
|---|---|---|---|---|
| 5,590,326 | * | 12/1996 | Manabe | 711/150 |
| 5,675,805 | * | 10/1997 | Boldo et al. | 395/706 |
| 5,701,480 | * | 12/1997 | Raz | 709/101 |
| 5,724,508 | * | 3/1998 | Harple, Jr. et al. | 709/205 |
| 5,724,564 | * | 3/1998 | Conder et al. | 712/234 |
| 5,752,026 | * | 5/1998 | Fortier | 707/103 |
| 5,774,644 | * | 6/1998 | McKinstry | 714/25 |
| 5,787,262 | * | 7/1998 | Shakid et al. | 709/205 |
| 5,806,074 | * | 9/1998 | Souder et al. | 707/201 |
| 5,828,880 | * | 10/1998 | Hanko | 709/106 |
| 5,835,758 | * | 11/1998 | Nochur et al. | 707/102 |
| 5,893,117 | * | 4/1999 | Wang | 707/203 |
| 5,925,098 | * | 7/1999 | Freund et al. | 709/203 |
| 5,956,506 | * | 9/1999 | Cobb et al. | 709/101 |
| 6,009,269 | * | 12/1999 | Burrows et al. | 717/4 |
| 6,012,083 | * | 1/2000 | Savitzky et al. | 709/202 |
| 6,016,490 | * | 1/2000 | Watanabe et al. | 707/8 |
| 6,021,413 | * | 2/2000 | Vaduvur et al. | 707/201 |
| 6,092,175 | * | 7/2000 | Levy et al. | 712/23 |

OTHER PUBLICATIONS

IBM Technical Disclosure Bulletin, vol. 37, No. 1, January 1994, "Method of Managing Main Storage Areas that are Shared Hierarchically by Threads", pp. 231–232.*

IBM Technical Disclosure Bulletin, vol. 37, No. 8, August 1984, "Method for Performance Enhancement in the Parallel Execution of Static Database Transactions", pp. 609–614.*

* cited by examiner

METHOD FOR MATCHING DISTRIBUTED TRANSACTIONS AND MACHINE-READABLE RECORDING MEDIUM WITH METHOD PROGRAMS

BACKGROUND OF THE INVENTION

1. Field of the Invention

The present invention relates to a method of matching transactions performed by a plurality of clients connected to a distributed network system through a network server.

This application is based on patent application No. Hei 09-187401 filed in Japan, the content of which is incorporated herein by reference.

2. Description of the Related Art

In a distributed network system connected to a plurality of clients sharing a common network server, when transactions involving different commands are requested by each client, different approaches have been used to respond to such a situation.

First conventional method which is a generally accepted approach in a distributed network system, can execute a plurality of transactions in parallel, by locking those preceding updating transactions of a common data base, and other transactions requesting inquiry or updating of the common data base are made to wait, so that the transactions calling for the common data base can be serialized chronologically.

In a second conventional method disclosed in a Japanese Patent Application, First Publication, Sho. 63-310042, when a plurality of clients issue commands of different semantics to a common data base, a consultation process is invoked so that the different clients can cooperate to arrive at a correct operational step.

In such methods of matching conflicting transactions, one of the problems is that the method can only offer a uniform mediation solution. The reason is that, in the first method, all the conflicting transactions are always serialized regardless of the contents of semantics conflicts. In the second method, mediation of conflicting transactions is carried out by consultations regardless of the contents of semantics conflicts.

Further problem in the second method is that for each conflicting transaction, a consulting step must always be carried out among the clients so that, if the cooperative step is being carried out on-line, the processes are frequently interrupted and become quite cumbersome.

SUMMARY OF THE INVENTION

It is an object of the present invention to provide a method for matching transactions in a distributed network system, in which application programs such as word and graphics processing are shared to provide a cooperative conflict resolution, to enable a plurality of conflicting transactions with semantics conflicts to be resolved in the network server, in each application program and for each content of semantic conflicts.

The object has been achieved in a method for matching transactions in a distributed network system serving a plurality of clients connected through a network server having network applications, wherein; a transaction of a data-change operation requested by a user application is received in a transactions manager of the network server; a received transaction is inspected for semantics conflicts with other transactions received from other clients by a semantics conflict detection section; the received transaction in the transactions manager is executed according to the data-change operation, when there is no semantics conflict; but when there is a semantics conflict, an address of a processing routine for resolving the semantics conflict is forwarded from the semantics conflict detection section to the transactions manager; the processing routine is executed by the transactions manager to resolve the semantics conflict.

More specifically the method is comprised by the following steps:

(1) forwarding a transaction generated by a change-data operation requested by a user application to the transactions manager;

(2) inspecting the transaction for accessing conflicts with respect to a group of data common to other transactions by using the transaction conflict detection section;

(3) requesting network applications to inspect for semantics conflicts in access-conflicting transactions by using respective semantics conflict detection section;

(4) inspecting the access-conflicting transactions for semantics conflicts by using own semantics conflict detection sections in each application;

(5) continuing execution of the transaction in transactions manager when there is no semantics conflict; but, when there is a semantics conflict, (6) receiving in the transactions manager, from a semantics conflict detection section, an address of a processing routine having a method consistent with contents of the semantics conflict for resolving the semantics conflict; and (7) executing the processing routine in the transactions manager, thereby resolving the semantics conflict.

Accordingly, when there is a semantics conflict in a number of conflicting transactions, a resolution method can be selected for each application and for each content of the semantics conflicts.

Also, when a semantics conflict in access-conflicting transactions relates to a value change of a common attribute in a common group of data, it is inspected to determine whether the difference in the extent change is within a range of pre-determined values, and if the change is within the pre-determined range, an address of a processing routine to execute only those transactions whose change values exceed a pre-determined difference range is forwarded to the transactions manager, or an address of a processing routine to execute transactions in a sequence of arrival of access-conflicting transactions is forwarded to the transactions manager.

Also, the method may include a step of pre-selecting processing routines for each network application and for each type of semantics conflicts from a plurality of processing routines for resolving semantics conflicts. This approach facilitates execution of any resolution method.

Also, the transactions manager may base a decision of whether a transaction being received from an on-line client conflicts with transactions received from other clients by detecting a wait-status for a locked common group of data.

A modified method for matching distributed transactions in a distributed network system serving a plurality of clients connected through a network server, is comprised by processes wherein: a transaction generated by a change-data operation requested by a user application is received in a transactions manager of the network server; a received transaction is inspected for a semantics conflict with other transactions received and recorded in a reception log from other clients by using a semantics conflict detection section; the received transaction is executed by the transactions manger when there is no semantics conflict; but when there is a semantics conflict, an address of a processing routine for resolving a semantics conflict is forwarded from the semantics conflict detection section to the transactions manager; and the processing routine is executed by the transactions manager, thereby resolving the semantics conflict.

In this case, when a transaction is received in the network server from a reconnected client, an inspection range for semantics conflicts of the transaction is restricted to a portion of transactions received from other clients and recorded in a reception log.

The methods present superior resolution of conflicts in a distributed network system, because the method enables to resolve conflicts for each application and for each content of semantics conflicts, thereby providing a resolution method consistent with the nature of the content of semantics conflicts.

Also, because, when semantics conflicts for a plurality of conflicting transactions are related to changing the value of common attributes and common data base, the method first examines whether the value to be changed is within a pre-determined range of values, and if it is within the range, a routine to execute only those transactions with large values of change, or a routine to execute those transactions in the order of arrival is applied. By adopting this approach, those conflicts with negligible degree of change can be executed without intervention by the user, thereby facilitating the process of executing cooperative work.

DESCRIPTION OF THE PREFERRED EMBODIMENT

Preferred embodiments will be presented with reference to the drawings.

Figure 1:
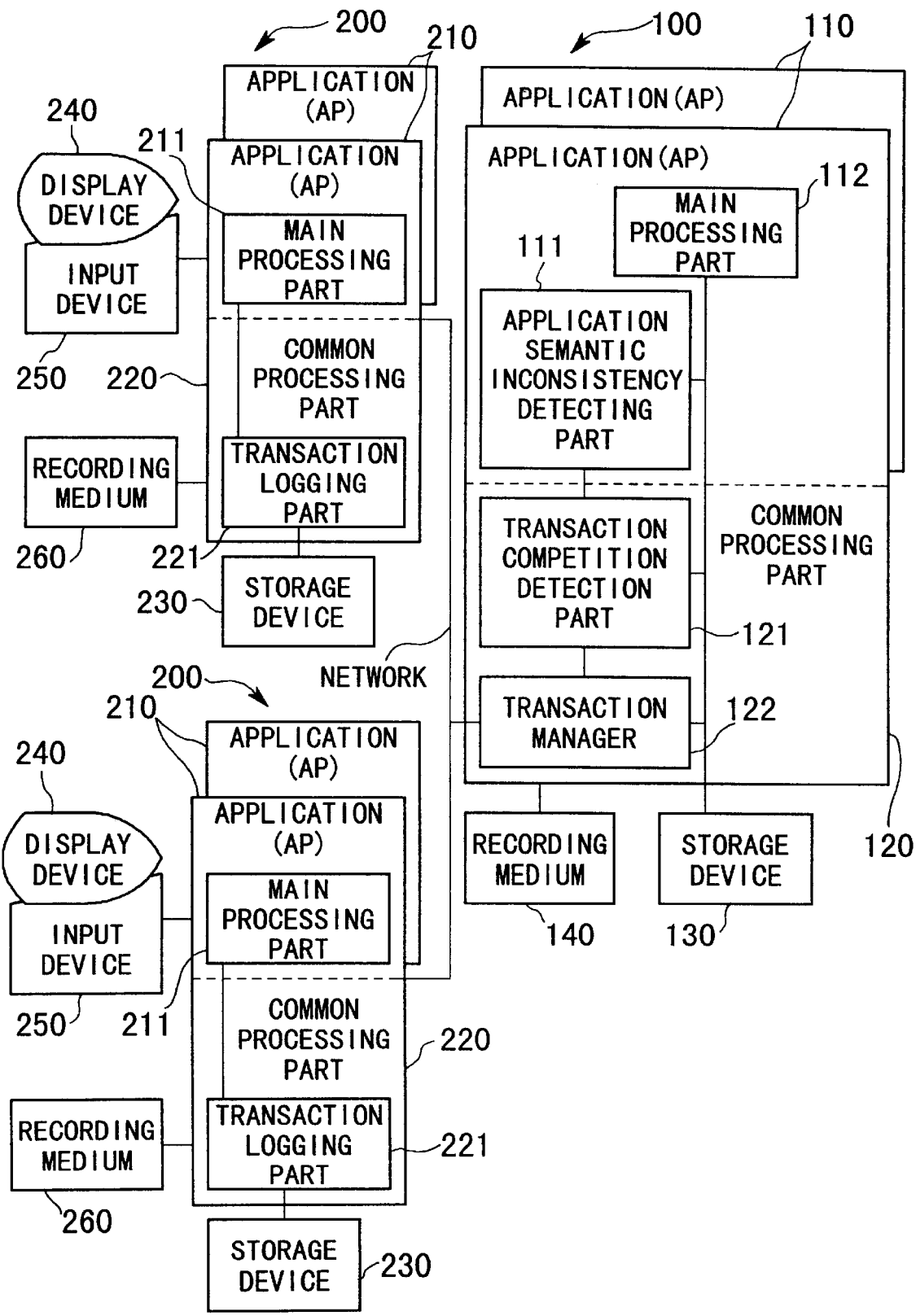
FIG. 1 is a block diagram of an example of a distribution processing system based on the method of the present invention.

FIG. 1 is a block diagram of an example of the distributed processing system according to the present invention. The distribution processing system is comprised by a plurality of clients 200 connected to a common network server 100 through network such as a local area network (LAN) or a wide area network (WAN).

Server 100 is comprised by a plurality of network applications 110; a processing section 120 common to all the network applications 110; a memory device 130 such as magnetic disk; and a recording medium 140. Each network application 110 is comprised by an application program such as word or graphic processing task, and comprises a main processing section 112 to manage basic functions necessary for word processing and graphics as well as a semantics conflict detection section 111 (shortened to sc-detection section 111). The processing section 120 is provided with a transaction conflict detection section 121 (shortened to tc-detection section 121) and a transactions manager 122.

The sc-detection section 111 provided within each network application 110 is a section to examine semantic conflicts of a plurality of transactions competing for its attention, and to decide on a resolution method. The sc-detection section 111 responds to a request from the transactions manager 122 to examine semantic conflicts among the conflicting transactions. The sc-detection section 111 then examines the conflicting transactions, and if there are no conflicts, the sc-detection section 111 so reports back to the transactions manager 122, and if there are conflicts, then it returns an address of a processing routine having a resolution method related to the detected semantic conflict. It is possible to install in the sc-detection section 111, addresses of processing routines having a suitable resolution method for resolving semantic conflicts in the conflicting transactions for each application, according to the nature of the respective semantic conflicts, during either bootup or system operation period.

The tc-detection section 121 detects transactions which are competing for attention of an application. In the present embodiment, a judgment as to whether a transaction conflict exists or not is made on the basis of whether or not a wait status to locked data base has been invoked as a result of executing a transaction.

Transactions manager 122 manages overall network transactions forwarded by the clients 200 and being executed on the network server 100, such as time-stamping each transaction of a client and recording in the memory device 130 as a transaction log (reception log), executing the requested transaction, and reporting the transaction result to the client. Also, when a number of conflicts for a certain network application 110 are detected by the tc-detection section 121, transactions manager 122 requests the sc-detection section 111 of the relevant network application 110 to examine the semantics conflicts, and if there is a semantics conflict, the transactions manager 122 calls for a respective processing routine at the addresses returned by the sc-detection section 111, thereby resolving this particular semantics conflict among the plurality of transactions. If the manager 122 receives a report from the sc-detection section 111 that there is no conflict, it continues execution of the plurality of competing transactions. Transactions manager 122 operates under a multi-thread mode (a number of modules in a group of logic devices) to enable parallel processing of a large number of transactions.

Recording medium 140 represents such machine-readable recording media as compact disk read-only memory(CD-ROM), magnetic disk, semiconductor memories, and the applications recorded therein are read by a computer in the server 100, and drives the network applications 110 and the common processing section 120 through the computer.

On the other hand, each client 200 is comprised by a plurality of user applications 210; a common processing section 220 common to the plurality of user applications 210; a memory device 230; a display device 240; an input device 250; and a recording medium 260. Each user application 210 is comprised by an application program to execute such tasks as word or graphic processing, and has a main processing section 211 to control basic functions of word and graphic processing when a change in input data is made through the input device 250, such as generation and execution of transactions corresponding to the change-data request, renewing the memory content in the memory device 230 or changing the image on the display device 240. Also, the common processing section 220 has a transaction logging section 221.

Common processing section 220 controls tasks such as forwarding each transaction corresponding to each request of the user generated by the user application 210, and applications matching to match transaction execution results received from the network server 100 of other client 200 with corresponding applications in its own client 200. Also, transaction logging section 221 undertakes tasks such as saving transactions forwarded to server 100 in the memory device 220 in sequence as transaction log data (transmission data), and when a transaction-cancel is received from server 100, to restore the content in the relevant user application 210 to the state prior to execution of the requested transaction.

Recording medium 260 represents such machine readable recording media as compact disk read-only memory (CD-ROM), magnetic disk, semiconductor memories, and the client applications recorded therein are read by a computer in the client 200, and drives the user applications 210 and the common processing section 220 through the computer.

The operation of the system follows a basic flow of events as follows. First, change-data command entered through a client user application 210 in a client 200 is executed in the client 200, and the transaction relevant to the data-change is forwarded to the network server 100. Upon receiving the data-change request, the server 100 is executes the transaction, and if it detects conflicting transactions in the tc-detection section 121, semantics conflicts and their resolution methods are decided by the sc-detection sections 111 in the respective network applications 110. Transactions manager 122 resolves conflicts according to the chosen resolution methods.

Figure 2:
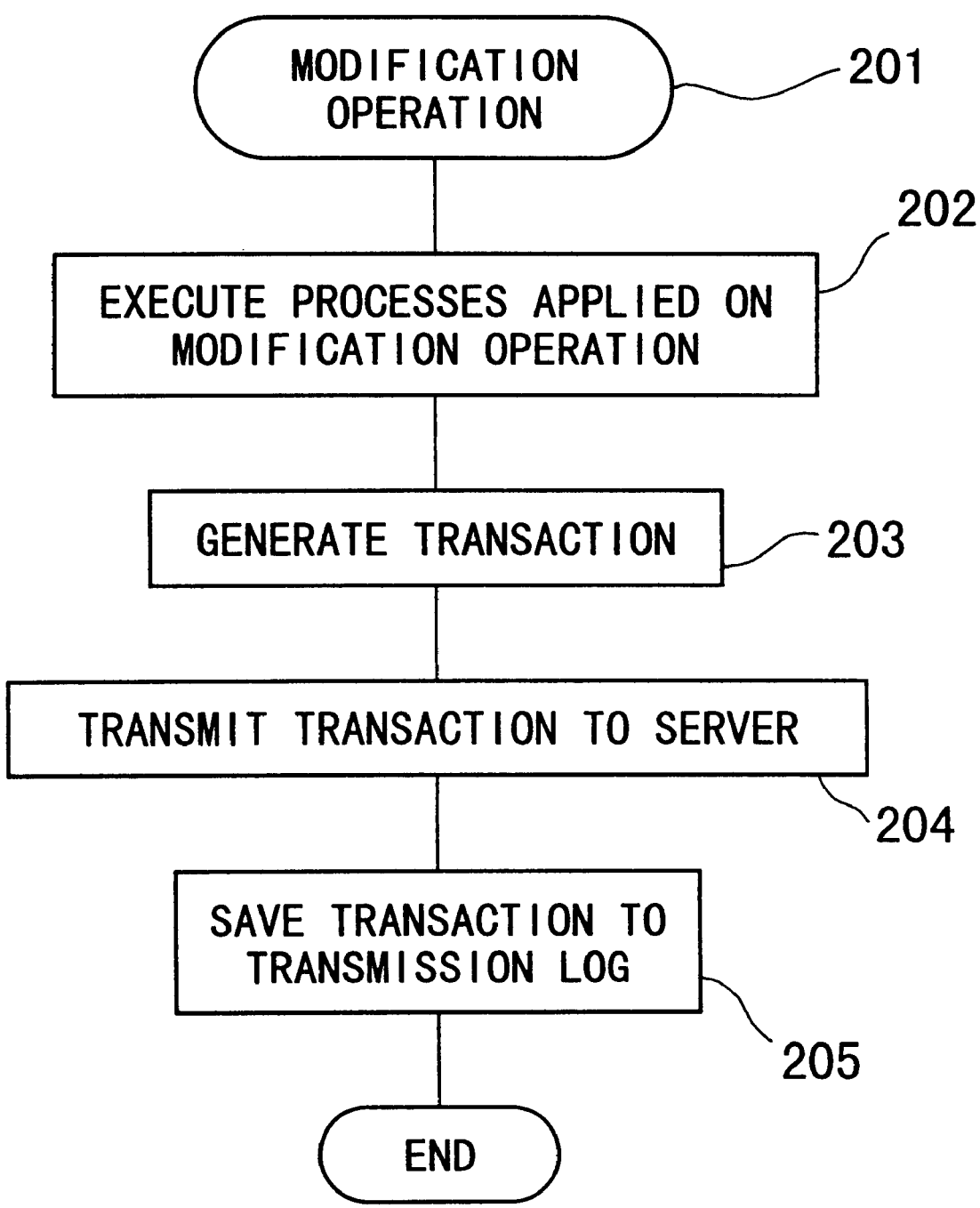
FIG. 2 is an example of the flowchart for processing clients.
Figure 3:
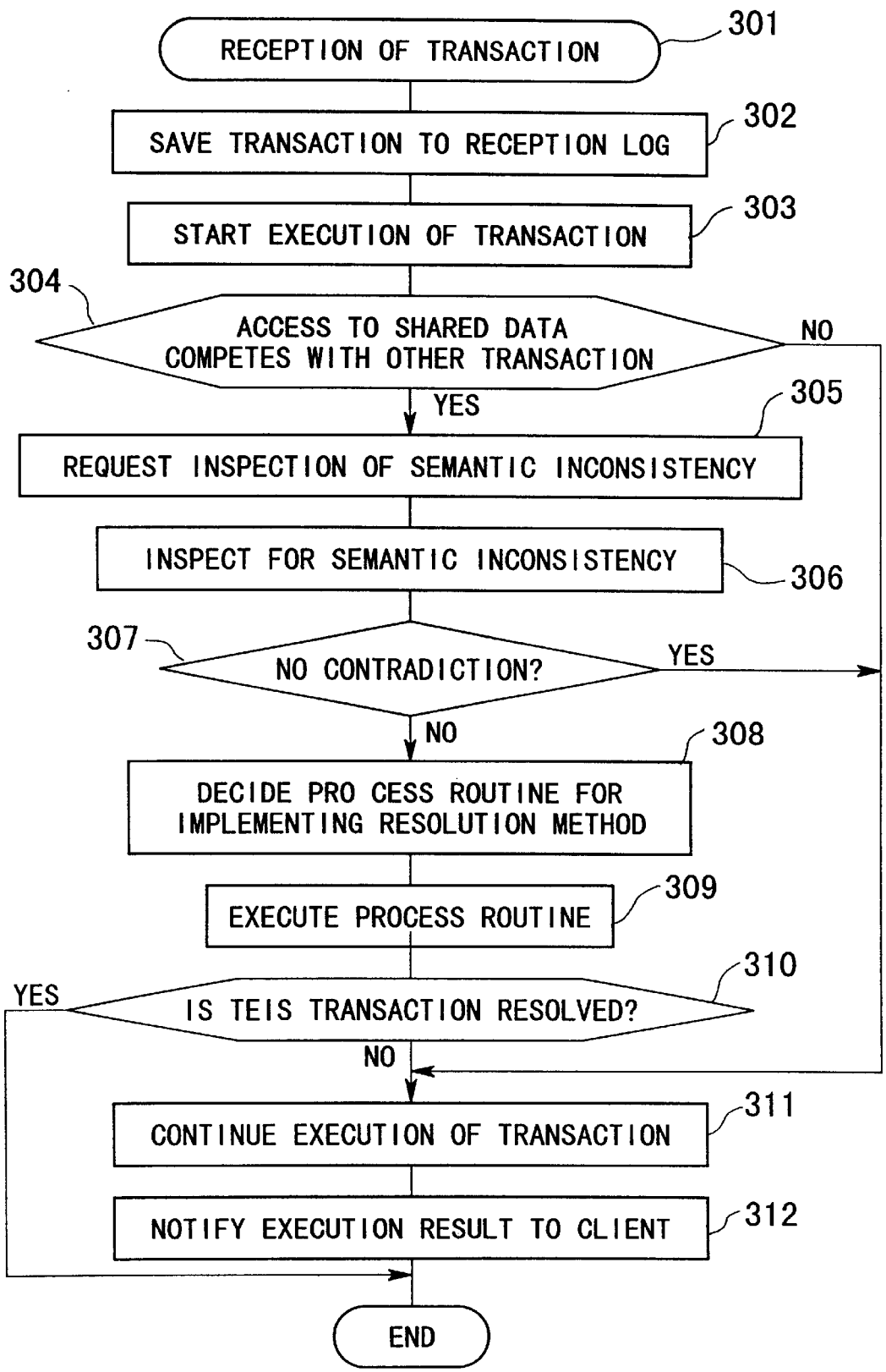
FIG. 3 is an example of the flowchart for processing servers.

FIG. 2 shows an example of the flowchart for processing in client 200, and FIG. 3 shows an example of the flowchart for processing in network server 100. The operation of the system will be explained with reference to FIGS. 1~3.

When a user of individual client 200 requests a data-change to an user application 210 through the input device 250 (step 201 in FIG. 2), the user application 210 in the respective client 200 executes the data-change (step 202). Each client 200 executes the task for a data-change immediately. Next, user application 210 generates a transaction for the data-change (step 203), and reports the generated transaction to the common processing section 220 which forwards the transaction through the network to the network server 100 (step 204). Transaction logging section 221 records the transaction as transmission data in the memory device 230.

When the transactions manager 122 in the network server 100 receives transactions related to certain network applications 110 from individual clients 200 (step 301 in FIG. 3), it stores the data in the memory device 130 temporarily as reception log data. Unexecuted transactions stored in the memory device 130 is readout by the transactions manager 122 in the order of arrival of data, to begin the execution process (step 303). In other words, relevant execution thread is assigned to the main processing section 112 of the relevant network applications 110 to execute the transaction. Whether or not the executing transaction has accessing conflict with other executing transactions for the same network application is checked by the tc-detection section 121 (step 304).

If the executing transaction does not conflict with other transactions (NO in step 304), the transaction process is continued (step 311). When the transaction is completed, the execution results are reported to other clients 200 excepting the originating client 200 (step 312). The other clients 200 receiving the report perform data-change operation in itself, thereby reflecting the data-change performed in the originating client 200.

When the tc-detection section 121 detects that there is a conflict with other transactions (YES in step 304), transactions manager 122 requests sc-detection section 111 in the relevant network application 110 to examine whether there are semantics conflicts in the conflicting transactions (step 305).

The sc-detection section 111 references the contents of the transactions in the reception log in the memory device 130 to examine semantics conflicts in the transactions (step 306). If there are no semantics conflicts (YES in step 307), the sc-conflict detection section 111 so informs the transactions manager 122 which continues the execution process (step 311).

In the meantime, if a semantics conflict does exist, the sc-detection section 111 selects a resolution method consistent with the content of the semantics conflict, and reports its address to the transactions manager 122 (step 308). Transactions manager 122 fetches the processing routine from the specified address, thereby resolving the conflicts among the various transactions (step 309). Specific examples will be presented later, but it suffices to mention at this point that processing routine performs canceling the transactions or altering the execution sequence for the transactions.

Next, if the current transaction is to be canceled (YES in step 310), the transactions manager 122 ends the current transaction by executing the processing routine. If the current transaction is not to be canceled, execution of the current transaction is continued (step 311), and when the execution task is completed, a completion is reported to other clients 200 (step 312). Those clients 200 receiving the report perform the same data-change in its own client 200, thereby reflecting the change performed in other client 200.

Next, the operations of client 200 and the server 100 will be illustrated with specific examples centered primarily about methods of matching transactions.

Figure 4:
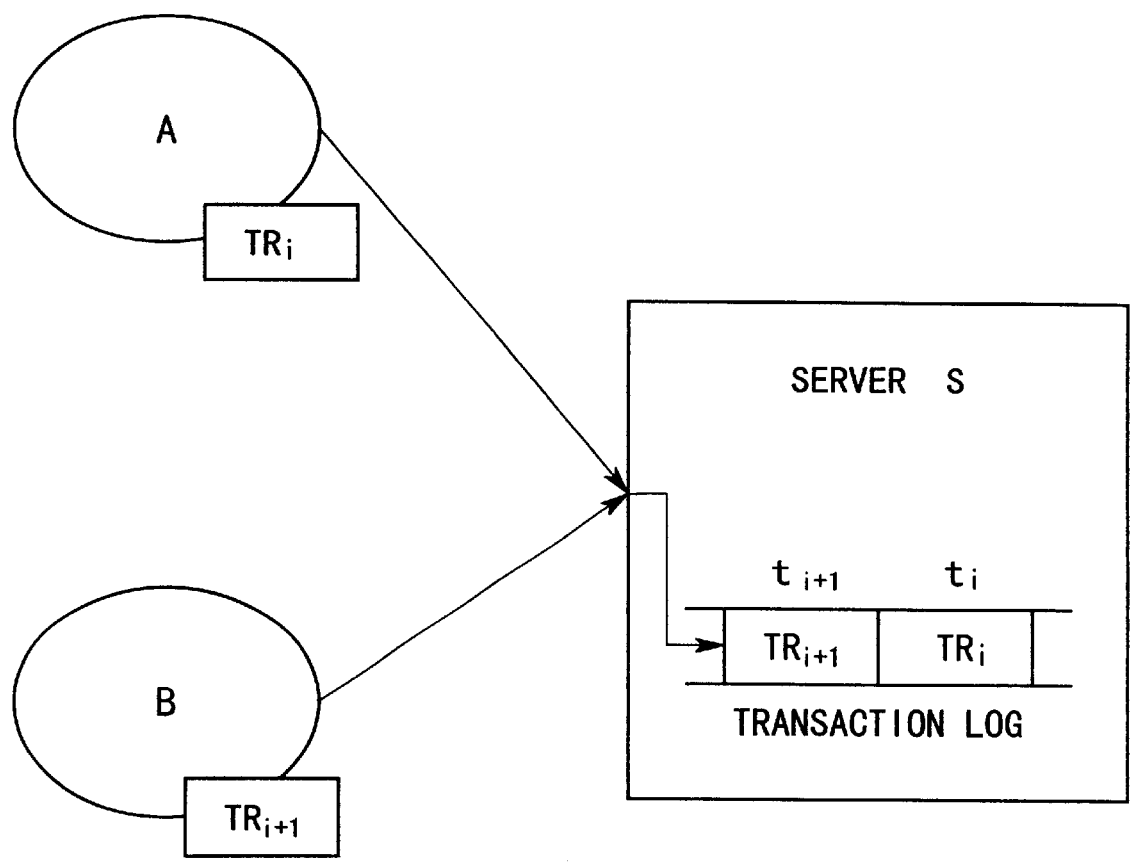
FIG. 4 is a block diagram of an example of distribution processing system based on a method of the embodiment.
Figure 5:
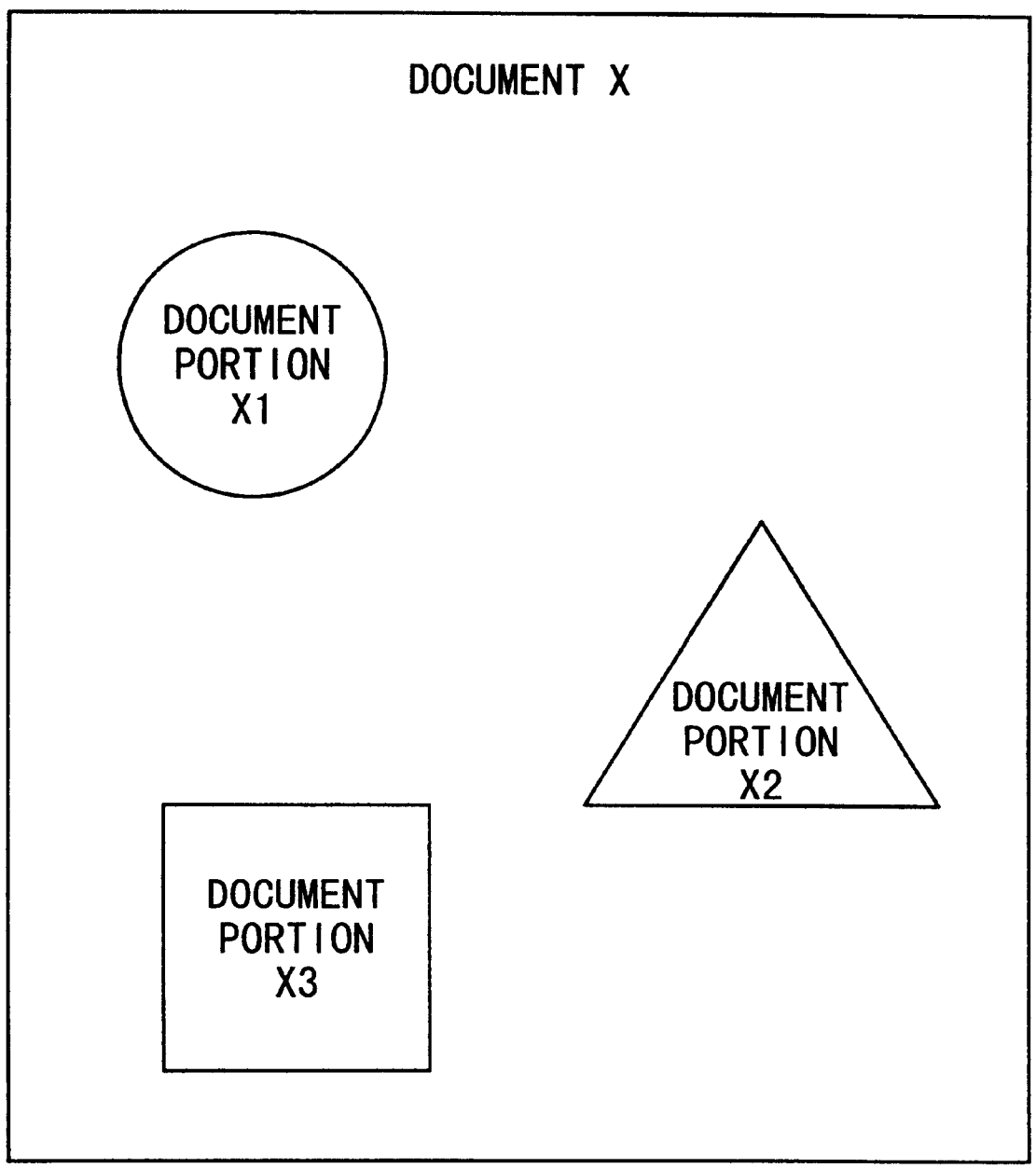
FIG. 5 is an example of the document configurations in the embodiment of the present invention.

For example, as shown in FIG. 4, suppose a distribution system has two clients A, B connected to a network server 100 (S) through a network, and a cooperative work is to be carried out on a document X using two graphic applications 110, 210. At the time of start of the work, suppose that a document X consisting of items X1, X2 and X3 (each constituting an object), as shown in FIG. 5, is stored in the memory device 230 of each client A, B and the memory device 130 in the server 100, and that both client A, B are observing the same image on the display device 240.

In this condition, when users of client A, B conduct data-changes to document X for user application 210 through the input device 250, then each user application 210 in both client A, B executes steps to perform data-changes and generates relevant transactions to correspond to the data-changes and reports to its own processing sections 220.

Figure 6:
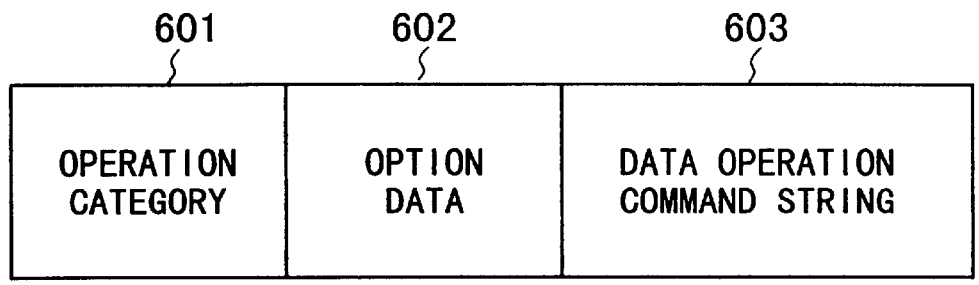
FIG. 6 is an example of the recording form for transactions.

FIG. 6 illustrates an example of the recording format for the transactions generated in this step. Data-operation command array 603 in FIG. 6 records contents of data-change commanded by the user in document X, such as a command to delete item X1 or a command to move the position of item X1.

Operational category 601 and option data 602 are application information to facilitate the process of inspecting for semantics conflicts by the sc-detection section 111. The operational category 601 is for recording the type of data operation to be carried out, and chooses one of either add object, delete object and change object attributes. For example, in a graphic application, add or delete object command refers to adding or deleting of shaped objects, i.e., a circle, a square and a triangle. Attributes refer to some characterizing attributes of shaped objects, such as position, size, fill color. Therefore, change of object attributes corresponds to a change in the position, size and color of each shaped object. Option data 602 refers to supplementary object data useful in deciding a method of mediation among the conflicting transactions. The use of the option data 602 will be explained later.

Upon receiving transactions from clients A, B, processing section 220 common to each client A, B forwards the transactions to the network server 100 through the network, and records them in memory device 230 as transmission data in the transaction logging section 221.

Upon receiving the transactions from clients A, B, transactions manager 122 in the server 100 records the transactions in the reception log of memory device 130, and prepares an execution thread for each received transaction to process a plurality of transactions in parallel. Also, transactions manager 122 keeps the tc-detection section 121 running in the background using a thread to detect any conflicts among the transactions.

If another transaction tries to lock on the common data base already locked by certain transactions (meaning that an accessing conflict has arisen), the tc-detection section 121 detects this event, and reports it to transactions manager 122 that a transaction conflict exists.

Upon receiving the conflict report, transactions manager 122 generates a thread and calls for the sc-detection section 111 together with an identifier for each of the conflicting transactions.

The sc-conflict detection section 111 reads the contents of the reception log in the memory device 130 to inspect the nature of the semantics conflicts in the conflicting transactions. The process of inspecting semantics conflict is carried out in consultation with the operational categories 601 (refer to FIG. 6) of the conflicting transactions and, when necessary, with the data-operation command array 603. If semantics conflict does not exit, this is so reported to the transactions manager 122. On the other hand, if there is a semantics conflict, then, the address of a processing routine having the resolution method for resolving the semantics conflict is returned to the transactions manager 122. The operation of the sc-detection section 111 will be explained with reference to specific examples.

Figure 7:
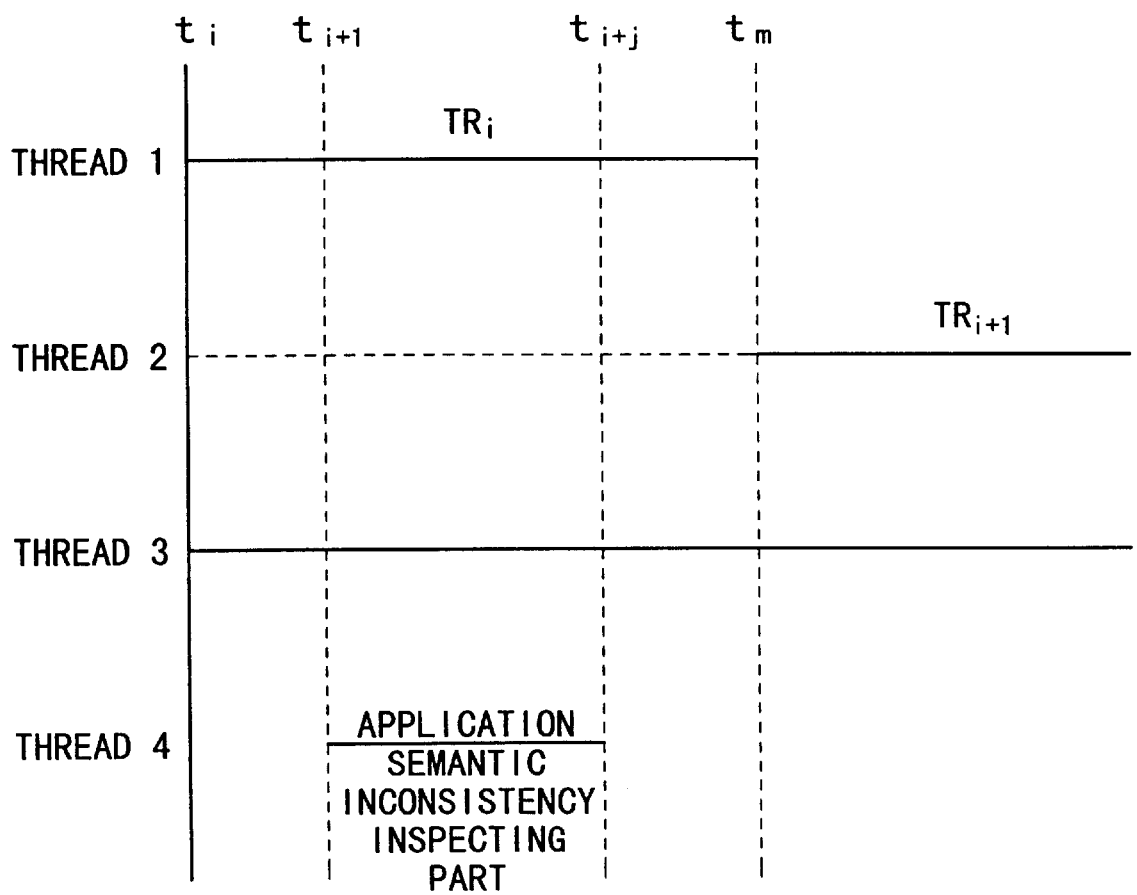
FIG. 7 is an illustration for executing a plurality of transactions on a server by a multi-threading method.

(1) Conflict Arising From Delete and Change Attributes Transactions for a Same Object:

An example will be illustrated with reference to FIGS. 4 and 5. If a "delete item X1" transaction requested by client A is immediately followed by a "change position of item X1" transaction from client B. Denoting the transaction by client A by $TR_i$ and the time of reception of $TR_i$ by the server 100 by $t_i$, and the transaction by the client B by $TR_{i+1}$, and the corresponding reception time by the server 100 by $t_{i+1}$, then for example, a thread 1 executes $TR_i$ and a thread 2 executes $TR_{i+1}$ on the server 100 as shown in FIG. 7. It is assumed that tc-detection section 121 is being executed by thread 3. If, while executing the preceding transaction $TR_i$ and a lock is applied to item X1, the succeeding transaction $TR_{i+1}$ is held up by referring to item X1. This accessing conflict is detected by the tc-detection section 121 running in the background, and the conflict is reported to the transactions manager 122. Transactions manager 122 then generates a thread 4 for use by sc-detection section 111, and fetches sc-detection section 111 in network application 110.

The sc-detection section 111 reads the contents of transactions, $TR_i$ and $TR_{i+1}$ in reception log of memory device 130. In this case, the operational category 601 (refer to FIG. 6) for transaction $TR_{i+1}$ is "delete item X1", and the operational category for transaction $TR_i$ is "change attributes". The sc-detection section 111 detects a semantics conflict that an object attributes change is being requested for an item to be deleted, and returns an address of a processing routine containing a resolution method to correspond with the type of current conflict to the transactions manager 122. Some specific examples of processing routines are explained below.

(a) When a semantics conflict for a succeeding transaction $TR_{i+1}$ is detected before completing execution of transaction $TR_i$, then, client A is asked to confirm which of the following course of action to take:
1) cancel transaction $TR_{i+1}$ and report it to client B;
2) cancel transaction $TR_{i+1}$ and report it to client A; and
3) switch execution sequence of transactions $TR_i$ and $TR_{i+1}$ such that $TR_i$ is canceled and $TR_{i+1}$ is executed first.

(b) When, after completing execution of transaction $TR_i$, a semantics conflict with a succeeding transaction $TR_{i+1}$ is detected, then, client A is asked to confirm which of the following course of action to take:
4) cancel transaction $TR_{i+1}$ and report it to client B; and
5) revert back to original state for transaction $TR_{i+1}$, and execute one of the courses in (a).

For example, if the address of the above processing routine $\bar{A}$ is returned by the sc-detection section 111, the transactions manager 122 cancels transaction $TR_{i+1}$ and reports it to client B. Item X1 is returned to the original position in client B. After competing execution of transaction $TR_i$, the result is forwarded to client B, and item X1 is deleted in client B also.

(2) Conflict Arising from Add-object and Delete-object Transactions:

With reference to FIGS. 4 and 5, an example would be a case of a "delete page P1 containing items X1~X3" transaction issued by client A is immediately followed by a "add new item X4" transaction from client B. Denoting the transaction by client A by $TR_i$ and the time of reception of $TR_i$ by the server 100 by $t_i$, and the transaction by the client B by $TR_{i+1}$ and the corresponding reception time by the server 100 by $TR_{i+1}$, then for example, thread 1 executes $TR_i$ and thread 2 executes $TR_{i+1}$ on the server 100 as shown in FIG. 7. It is assumed that tc-detection section 121 is being executed by thread 3. If, while executing the preceding transaction $TR_i$, a lock is applied to P1 containing items X1~X3, the succeeding transaction $TR_{i+1}$ is held up by referring to item X1 on P1. This accessing conflict is detected by the tc-detection section 121 running in the background, and the conflict is reported to the transactions manager 122. Transactions manager 122 generates a thread 4 for use by tc-detection section 111, and fetches sc-detection section 111 in network application 110.

The sc-detection section 111 reads the contents of transactions, $TR_i$ and $TR_{i+1}$ in the reception log of memory device 130. In this case, the operational category 601 (refer to FIG. 6) for transaction $TR_{i+1}$ is "delete page P1", and the operational category for transaction $TR_i$ is "add item X4 to P1". The sc-detection section 111 detects a semantics conflict that a request for add a new object is being made in an object to be deleted, and returns an address of a processing routine containing a resolution method to correspond to the type of conflict to the transactions manager 122. Specific contents of applicable processing routines are similar to those presented in (1). It is obvious that other processing routines are possible.

(3) Conflict Arising from Delete-object Transactions:

With reference to FIGS. 4 and 5, an example would be a case of a "delete item X1" transaction requested by client A is immediately followed by a "delete item X1" transaction from client B. Denoting the transaction by client A by $TR_i$ and the time of reception of $TR_i$ by the server 100 by $t_i$, and the transaction by client B by $TR_{i+1}$ and the corresponding reception time by the server 100 by $TR_{i+1}$, then for example, thread 1 executes $TR_i$ and thread 2 executes $TR_{i+1}$ on the server 100 as shown in FIG. 7. It is assumed that tc-detection section 121 is being executed by thread 3. When, while executing the preceding transaction $TR_i$, a lock is applied to item X1, the succeeding transaction $TR_{i+1}$ is held up in by referring to item X1. This accessing conflict is detected by the tc-detection section 121 running in the background, and a conflict is reported to the transactions manager 122. Transactions manager 122 generates a thread 4 for use by tc-detection section 111, and fetches sc-detection section 111 in network application 110.

The sc-detection section 111 reads the contents of transactions, $TR_i$ and $TR_{i+1}$ in the reception log of memory device 130. In this case, the operational category 601 (refer to FIG. 6) for transaction $TR_{i+1}$ is "delete item X1", and the operational category for transaction $TR_i$ is "delete item X1". The sc-detection section 111 detects a semantics conflict that an object to be deleted is again being requested to be deleted, and returns an address of a processing routine containing a resolution method to correspond with the type of conflict to the transactions manager 122. Specific examples of processing routine would be to cancel succedding transaction $TR_{i+1}$ whether the semantics conflict with $TR_{i+1}$ is detected either before or after completing execution of transaction $TR_i$.

(4) Conflicts Arising from Attributes-change for a Same Object:

With reference to FIGS. 4 and 5, an example would be a case of a "move item X1 to p" transaction issued by client A is immediately followed by a "move item X1 to q" transaction from client B. Denoting the transaction by client A by $TR_i$ and the time of reception of $TR_i$ by the server 100 by $t_i$, and the transaction by the client B by $TR_{i+1}$ and the corresponding reception time by the server 100 by $TR_{i+1}$, then for example, thread 1 executes $TR_i$ and thread 2 executes $TR_{i+1}$ on the server 100 as shown in FIG. 7. It is assumed that tc-detection section 121 is being executed by thread 3. If, while executing the preceding transaction TRi, a lock is applied to item X1, the succeeding transaction $TR_{i+1}$ is held up in referring to item X1. This accessing conflict is detected by the tc-detection section 121 running in the background, and the conflict is reported to the transactions manager 122. Transactions manager 122 generates a thread 4 for use by tc-detection section 111, and fetches sc-detection section 111 in network application 110.

The sc-detection section 111 reads the contents of transactions, $TR_i$ and $TR_{i+1}$ in the reception log of memory device 130. In this case, the operational category 601 (refer to FIG. 6) for transaction $TR_{i+1}$ is "change attributes", and the operational category for transaction $TR_i$ is also "change attributes". In cases such as this that a plurality of transactions experiencing accessing conflict are demanding changes in attributes, the sc-detection section 111 closely examines the requested change in attributes data with reference to data-operation command array 603 in FIG. 6 for transactions $TR_i$ and $TR_{i+1}$.

In this example, the semantic conflict is that transaction $TR_{i+1}$ requests relocation of item X1 to position p while transaction $TR_i$ requests the same item X1 to be relocated to a position q. However, both transactions share a common attribute of change in "position". In this case, the sc-detection section 111 obtains a difference between the positions p and q, and if the difference value is less than a pre-determined value, a conflict resolution method for dealing with semantics conflicts of very small differences is invoked, and the address of a suitable processing routine is returned to the transactions manager 122. Some examples of the processing routines are as follows.

(a) When a semantics conflict for a succeeding transaction $TR_{i+1}$ is detected before completing execution of transaction $TR_i$, then, client A is asked to confirm which of the following course of action to take:
1) the difference between distance p in transaction $TR_{i+1}$ and distance q in transaction $TR_i$ is compared, and the larger distance value of the two distances is executed; and
2) after executing transaction $TR_i$, execute transaction $TRi+_1$, in other words, do a sequential execution.

(b) When, after completing execution of transaction $TR_i$, a semantics conflict for a succeeding transaction $TR_{i+1}$ is detected, then, client A is asked to confirm which of the following course of action to take: cancel transaction $TR_{i+1}$ and report it to client B; and
3) compare movement distances for transactions $TR_i$ and $TR_{i+1}$, and if the distance value for transaction $TR_i$ is larger than that for transaction $TR_{i+1}$, then cancel transaction $TR_{i+1}$ and report it to client B; and
4) after completing execution of transaction $TR_i$, transaction $TR_{i+1}$ is executed, in other words, do a sequential execution.

Accordingly, when a semantics conflict of various transactions having accessing conflict is caused by transaction to change the same attribute value in the same data, the sc-detection section further examines whether the difference in the change lies within a pre-determined range of values, and if the difference is within the predetermined range of values, then an address of a processing routine for executing either the large valued transaction or a sequential transaction of conflicting transactions to the transactions manager. Other attributes such as size and color are handled in the same manner.

When the difference value between the position p in transaction $TR_i$ and position q in transaction $TR_{i+1}$ exceeds a pre-determined value, then a processing routine is chosen by the same method as (1) presented above.

When the attribute value to be changed in transactions $TR_i$ and $TR_{i+1}$ are different, it is considered that a semantics conflict does not exist. An example of the non-conflicting transactions in the access-conflicting transactions is a transaction to add new items in the same page.

Next, the use of option data 602 included in the recording of transactions shown in FIG. 6 will be explained.

One method of utilizing the option data 602 is to enable or disable cancellation for data-change by a user who requested the data-change transaction. In the embodiment above, a case was presented in which the transactions manager 122 in the network server can unilaterally cancel one of a plurality of transactions having semantics conflicts. A user who does not want such a unilateral cancellation can specify "disable cancellation" during data-change, and this information is stored in the option data 602 by the user application 210 and is considered at the time of semantics conflict detection stage by the sc-detection section 111. In this case, an example of contents in the processing routines selected by the sc-detection section 111 would be to stop executing conflicting transactions, and to prompt a plurality of clients which entered conflicting transactions to decide which of the transactions to be executed. If a transaction is selected by a majority count, for example, that transaction is executed and other transactions are canceled.

Another method of utilizing the option data 602 is to enable the client side to enter information useful in detecting details of the semantics conflict in the option data 602 to facilitate the detection of semantics conflict by the sc-detection section 111. For example, in the case presented in (4), "move item X1 to position p" is entered in the option data 602 of client A, as a piece of detailed information of changes in the attribute data, and "move item X1 to position q" is entered in the option data 602 of client B as a piece of detailed information of changes in the attribute data. By adopting this method, the sc-detection section 111 can judge the details of semantics conflict without analyzing the data-operation command array 603.

In the above embodiments, methods of matching are related to transactions forwarded from client 200 while it is connected on-line to the network server 100, but the method to be presented is applicable to distributed transactions which may be conducted from a portable terminal in a mobile environment in which client 200 is used first separately, independent of the network, and then re-connected through the network to the network server 100 to conduct a cooperative work. This will be explained in the following.

while client 200 is connected to the server 100, transactions manager 122 in the server 100 forwards the latest identifier of a transaction stored in the memory device 130 in the transaction log to client 200 which stores the latest identifier. When client 200 severs connection to the network server 100, subsequent latest identifiers cannot be received by the server 100. However, when client 200 is re-connected to the server 100, the server 100 can access the transaction log generated while client 200 was separated from the network (those transactions of client 200 whose execution results have not been forwarded to the network server 100) by sending the latest identifier stored in client 200 to the server 100.

Client 200 can perform tasks such as word processing by executing user applications even when separated from the server 100. However, because it is not connected to the server 100, transactions generated by user applications 210 are not forwarded to the server 100, and they are stored only in memory device 230. When client 200 is re-connected to the server 100, stored transactions are transferred to the server 100.

In conventional methods of conflict resolution, transactions manager 122 in the network server 100 examines successive transactions (made while it was separated from the network) and now forwarded from the memory device 130 of client 200 for semantics conflicts with other transactions, and if there is a semantics conflict, transactions manager 122 cancels the connection. The distributed transaction method of the present invention is applicable to this type of situation. In the present method, transactions manager 122 calls for the sc-detection section 111 to inspect semantics conflicts, and if there are semantics conflicts, processing routines to resolve the conflicts are selected.

Figure 8:
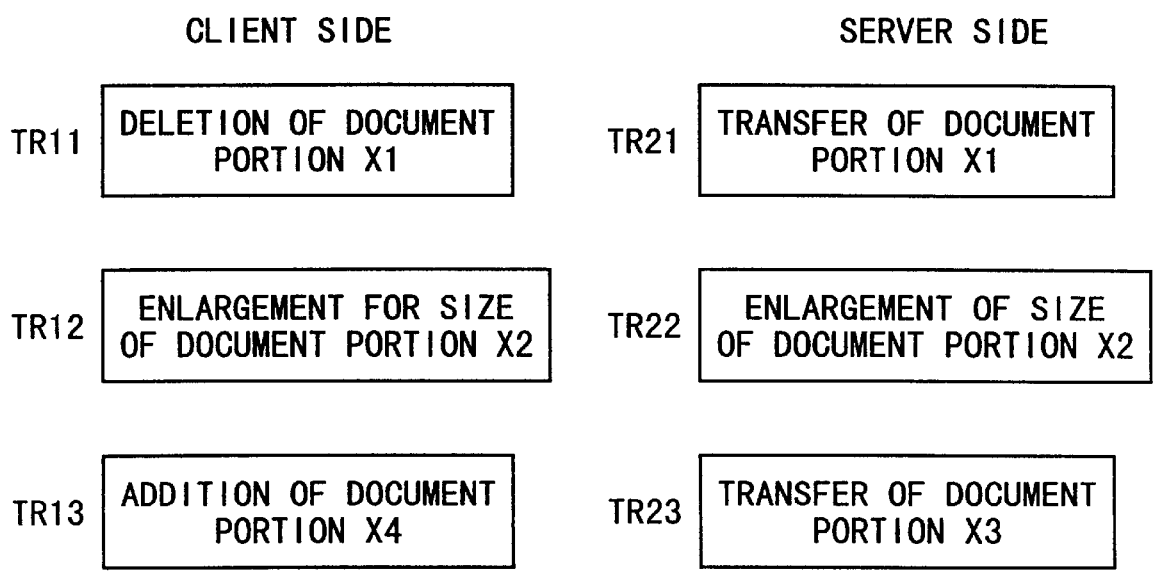
FIG. 8 is an example of transactions forwarded by reconnected client, and an example of transaction logs on a server at this point in time.

For example, as shown in FIG. 8?, suppose that transactions TR11~TR13 are sent by re-connected client 200.

Suppose also that while client 200 was separated from the server 100, there have been generated transactions TR21~TR23 which are now recorded as logged data in the memory device 130. In this case, the sc-detection section 111 detects that semantics conflicts exits in transactions TR11 and TR21. As an example, transaction manager 122 selects a processing routine to cancel transaction TR11. Also, it detects that there is a semantics conflict between transactions TR12 and TR22, and selects, for example, a processing routine to cancel transaction TR21. There is no semantics conflicts regarding other transactions. The result is that transactions TR11, 12 are canceled in the re-connected client 200, and execution results for transactions TR21, TR22, and TR23 are sent to client 200 from the server 100 and are so entered in the memory section of client 200. In this state, client 200 has executed transactions for TR13, TR21, TR22 and TR23. The server 100 executes transaction TR13, and forwards the executed results to other clients. All the clients are now in the same state.

Instead of detecting semantics conflicts for transactions TR11~TR13 in the logging section of memory section 130 with all the transactions TR21~TR23 performed while client 200 was separated from the server 100, it may be arranged so that only the current transaction (a transaction to be executed now) of the transactions TR21~TR23 recorded in the transaction logging section of the memory device 130 is examined for semantics conflict. Conditions for defining time intervals may be chosen by network applications 110 as a freely selectable parameter. For example, by defining a condition t±a, and if a=1, semantics conflicts are inspected for one transaction before and after the current transaction. Therefore, in FIG. 8?, suppose transaction TR23 is the current transaction, then transaction TR21 is excluded. The result is that transaction TR11 would be considered not to be in conflict, and is executed by the server 100, and the executed results are forwarded to other clients, and item X1 will be deleted from all clients.

What is claimed is:

1. A method for matching transactions in a distributed network system servicing a plurality of clients connected through a network server comprising a transactions manager, a transaction conflict detection section and a plurality of network applications, each network application comprising a semantics conflict detection section specific to a task, comprising:

forwarding a transaction generated by a change-data operation requested by a user application to said transactions manager;

recording said transaction in a memory device of said network server and preparing an execution thread for each received transaction to process a plurality of transactions in parallel;

inspecting said transaction for accessing conflicts with respect to a group of data common to other transactions by using said transaction conflict detection section;

requesting network applications to inspect for semantics conflicts in access-conflicting transactions by a using respective semantics conflict detections section;

comparing access-conflicting transactions to detect a semantics conflict by using a respective semantics conflict detection section in each network application;

when no semantics conflict is detected, continuing execution of said transaction in said transactions manager;

when a semantics conflict is detected, receiving in said transactions manager, from a semantics conflict detection section, an address of a processing routine having a method consistent with contents of said semantics conflict for resolving said semantics conflict, and executing said processing routine in said transactions manager, thereby resolving said semantics conflict.

2. The method according to claim 1, wherein, when a semantics conflict in access-conflicting transactions relates to a value change of a common attribute in a common group of data, a network application forwards an address of a processing routine to execute only those transactions whose change values exceed a pre-determined difference range of values or an address of a processing routine to execute transactions in a sequence of arrival of access-conflicting transactions.

3. The method according to claim 2, further comprising pre-selecting processing routines for each network application and for each type of semantics conflicts from a plurality of processing routines for resolving semantics conflicts.

4. The method according to claim 2, wherein said transactions manager bases a decision of whether a transaction being received from an on-line client conflicts with transactions received from other clients by detecting a wait-status for a locked common group of data.

5. The method according to claim 1, further comprising pre-selecting processing routines for each network application and for each type of semantics conflicts from a plurality of processing routines for resolving semantics conflicts.

6. The method according to claim 5, wherein said transactions manager bases a decision of whether a transaction being received from an on-line client conflicts with transactions received from other clients by detecting a wait-status for a locked common group of data.

7. The method according to claim 1, wherein said transactions manager bases a decision of whether a transaction being received from an on-line client conflicts with transactions received from other clients by detecting a wait-status for a locked common group of data.

8. A method for matching transactions in a distributed network system serving a plurality of clients connected on a network, comprising:

forwarding a transaction generated by a change-data operation requested by a user application running on one of the client computer to a transactions manager of a corresponding network application on a network server;

recording said transaction in a memory device of said network server and preparing an execution thereof for each received transaction to process a plurality of transactions in parallel;

inspecting said transaction for accessing conflicts with respect to a group of data common to other transactions by using a transaction conflict detection section of the network application on the server;

requesting network applications running on the network server to compare access-conflicting transactions to detect a semantics conflict by using a respective semantics conflict detection section of the respective network application;

inspecting said access-conflicting transactions for semantics conflicts by using a respective semantics conflict detection section in each network application;

continuing execution of said transaction in said transactions manager when there is no semantics conflict; but, when there is a semantics conflict, receiving in said transactions manager, from a semantics conflict detection section, an address of a processing routine having a method consistent with contents of said semantics conflict for resolving said semantics conflict; and executing said processing routine in said transactions manager, thereby resolving said semantics conflict.

9. The method of claim 8, wherein, when a semantics conflict in access-conflicting transactions relates to a value change of a common attribute in a common group of data, one of the network applications forwards an address of a processing routine to execute only those transactions whose change values exceed a pre-determined difference range of values or an address of a processing routine to execute transactions in a sequence of arrival of access-conflicting transactions.

10. The method of claim 9, further comprising pre-selecting processing routines for each network application and for each type of semantics conflicts from a plurality of processing routines for resolving semantics conflicts.

11. The method of claim 9, wherein said transactions manager bases a decision of whether a transaction being received from an on-line client conflicts with transactions received from other clients by detecting a wait-status for a locked common group of data.

12. The method of claim 8, further comprising pre-selecting processing routines for each network application and for each type of semantics conflicts from a plurality of processing routines for resolving semantics conflicts.

13. The method of claim 12, wherein said transactions manager bases a decision of whether a transaction being received from an on-line client conflicts with transactions received from other clients by detecting a wait-status for a locked common group of data.

14. The method of claim 8, wherein said transactions manager bases a decision of whether a transaction being received from an on-line client conflicts with transactions received from other clients by detecting a wait-status for a locked common group of data.

15. A method for matching transactions in a distributed network system serving a plurality of clients connected through a network server having network applications, comprising:

receiving a transaction of a data-change operation requested by a user application in a transactions manager of said network server;

recording said transaction in a memory device of said network server and preparing an execution thread for each received transaction to process a plurality of transactions in parallel;

comparing, using a semantics conflict detection section in a network application, a received transaction with other transactions received from other clients to detect a semantics conflict between said received transaction and said other transactions;

when there is no semantics conflict, executing said received transaction in said transactions manager according to said data-change operation; and when there is a semantics conflict, forwarding an address of a processing routine for resolving said semantics conflict from said semantics conflict detection section to said transactions manager and executing said processing routine by said transactions manager to resolve said semantics conflict.

16. The method according to claim 15, wherein said processing routine is related to a detected semantics conflict.

17. The method according to claim 15, wherein said processing routing is not associated with a characteristic of said data.

18. A method for matching distributed transactions in a distributed network system serving a plurality of clients connected through a network server, comprising:

receiving a transaction generated by a change-data operation requested by a user application in a transactions manager of said network server;

recording said transaction in a memory device of said network server and preparing an execution thread for each received transaction to process a plurality of transactions in parallel;

comparing, using a semantics conflict detection section in a network application, a received transaction with other transactions received and recorded in a reception log from other clients to detect a semantics conflict between said received transaction and said other transactions;

executing said received transaction by said transactions manager when there is no semantics conflict; and forwarding an address of a processing routine for resolving a semantics conflict from said semantics conflict detection section to said transactions manager when there is a semantics conflict and executing said processing routine by said transactions manager, thereby resolving said semantics conflict.

19. The method according to claim 18, wherein, when a transaction is received in said network server from a reconnected client, an inspection range for semantics conflicts of said transaction is restricted to a portion of transactions received from other clients and recorded in a reception log.

20. A machine readable recording medium comprising a program for matching transactions in a distributed network system serving a plurality of clients connected through a network server, the program comprising:

forwarding a transaction generated by a change-data operation requested by a user application to said transactions manager;

recording said transaction in a memory device of said network server and preparing an execution thread for each received transaction to process a plurality of transactions in parallel;

inspecting said transaction for accessing conflicts with respect to a group of data common to other transactions by using said transaction conflict detection section;

requesting network applications to inspect for semantics conflicts in access-conflicting transactions by using a respective semantics conflict detection section;

comparing said access-conflicting transactions to detect semantics conflicts by using a respective semantics conflict detection section in each network application;

continuing execution of said transaction in said transactions manager when there is no semantics conflict; but, when there is a semantics conflict, receiving in said transactions manager an address of a processing routine having a method for matching transactions consistent with contents of semantics conflicts, from said semantics conflict detection section, when there is a semantics conflict; and executing said processing routine in said transactions manager, thereby resolving said semantics conflict.

* * * * *